United States Patent Office 3,338,543
Patented Aug. 29, 1967

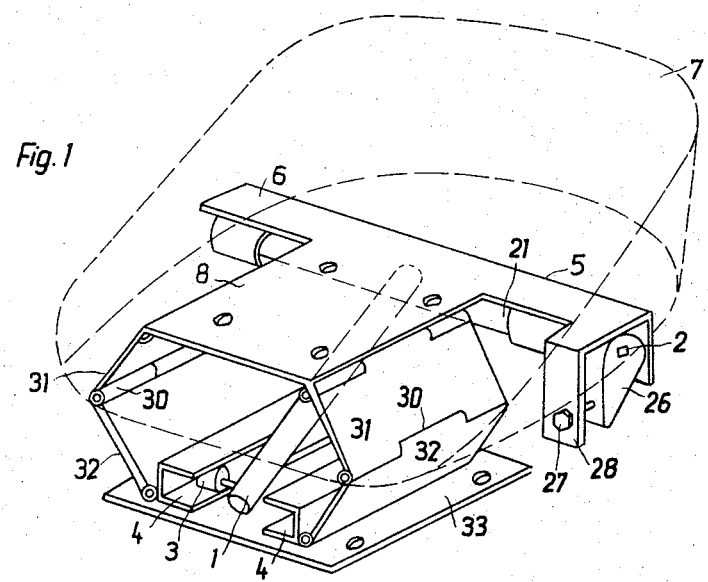
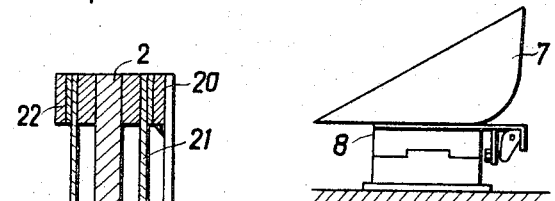
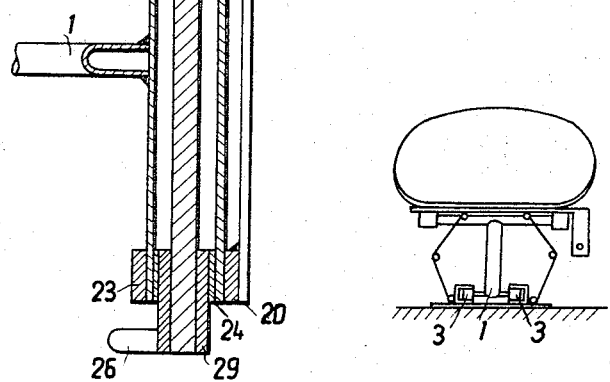

3,338,543
SPRING SUSPENSION FOR SEATS
Anton Stuckenberger, Vagen, and Arnold Tschursch, Hinrichssegen, Germany, assignors to Georg Fritzmeier, Kommanditgesellschaft, Grosshelfendorf, above Munich, Germany, a German firm
Filed July 7, 1965, Ser. No. 470,099
Claims priority, application Germany, Oct. 13, 1964,
F 44,216
4 Claims. (Cl. 248—399)

ABSTRACT OF THE DISCLOSURE

A spring suspension for seats, particularly tractor bucket seats, in which a torsion bar serves as a spring element. Torque is applied to the bar by a swing arm, the deflectable end of which is slidably supported.

---

The invention relates to a spring suspension for seats, particularly for bucket seats in tractors, comprising a torsion bar as the spring element.

In conventional suspensions of the specified kind the torsion bar is located crosswise under the seat in the underframe of the seat, the torque being applied to the torsion bar by a swing arm attached at its end remote from the torsion bar to the front of the seat. At the same time the seat is slidably guided in guide means situated behind the backrest of the seat and adapted to guide the seat up and down in a linear motion. This arrangement of the suspension has the drawback that the presence of the guide means at the back of the seat and the attachment of the swing arm to the front of the seat together generate coercive forces which cause the seat to perform a tilting motion about a transverse horizontal axis. From the point of view of the user of the seat this means that the back rest kicks him in the back whenever the seat rides up and down.

The object of the present invention is to construct the suspension in such a way that this unwanted motion of the seat in suspensions of the specified kind will not occur.

This is achieved by applying the torque to the torsion bar by means of a swing arm that is not attached to the seat, but supported, preferably by means of rollers, in parallel guide ways.

This arrangement permits the seat to ride up and down in a completely linear translatory motion without being tipped. Coercive forces are not generated and the additional strain on materials these involve is therefore also eliminated with a corresponding improvement in the durability of the seat and of its suspension.

A useful embodiment of the proposed arrangement is one in which the torsion bar is mounted under the seat on a supporting plate which carries the same and which in length does not exceed the width of the seat, whereas the parallel ways for guiding the deflectable end of the swing arm are provided on a fixed baseplate. This arrangement keeps the floor under the seat clear of obstructions which might trip up a person passing the seat.

The parallel ways may be simply embodied in two channel section rails with their open sides facing each other for the reception each of a roller on opposite sides of the swing arm.

A particularly useful design is one on which the swing arm is attached rigidly to the centre of a tube surrounding the torsion bar which is tightly clamped into one end of the tube, whereas the other end of the tube rotatably contains a sleeve which is fast on the corresponding end of the torsion bar and which is prevented from rotating by the supporting plate outside the tube. The torque is thus applied to one end of the torsion bar and reactively taken up at the other end. This arrangement has the special advantage that it offers the possibility of easily adjusting the bias of the torsion bar. To this end the sleeve need merely be provided with a radial arm held by an adjustable screw in a retaining member formed on the supporting plate.

In order to prevent the seat from tipping sideways the supporting plate may be guided on opposite sides by a symmetrical toggle device consisting of two hinged members of which one is hinged to the supporting plate and the other to the baseplate, the hinge axes extending in planes that are normal to the axis of the torsion bar. This arrangement provides a compact complete seat suspension which can be readily produced as a unit assembly.

The invention will be hereunder described by reference to an embodiment schematically shown in the drawings in which FIG. 1 is a perspective view of a seat suspension according to the invention, FIG. 2 is a side elevation of a seat suspension according to FIG. 1, for a bucket seat, FIG. 3 is a front view of the same seat suspension with a bucket seat, and FIG. 4 is a horizontal section taken through the axis of the torsion bar showing the manner in which the latter is mounted.

In the seat suspension illustrated in FIGURE 1 comprising a torsion bar as the spring element, the torque is applied to the torsion bar 2 by a swing arm 1. The deflectable end of the swing arm is guided by rollers 3 on opposite sides of the swing arm riding in parallel guideways constituted by two channel-section rails.

The torsion bar extends horizontally across the underside of the seat inside an angle section 5 of which the horizontal flange 6 is rigidly attached to or integral with a supporting plate 8 for a bucket seat 7. Mounted in a bush 20 in the angle section 5 is a tube 21 which is rigidly connected to the swing arm 1. The tube encloses the torsion bar 2 which is tightly clamped at one end 22 into the tube 21. The other end 23 of the tube in a sliding bearing 24 rotatably contains a coaxial sleeve which is fast on the corresponding end of the torsion bar. Outside the tube the sleeve carries a radial arm 26 which bears against the end of an adjustable screw 27 working in a retaining flange 28 formed on the angle section 5. The adjustable screw permits the end of the torsion bar to be twisted in relation to its other end 22 and thus to be torsionally biased.

For stabilising and reliably guiding the supporting plate 8 the latter is attached on each side to a symmetrical toggle guide each consisting of 2 plates 31 and 32 hinged together at 30, the free end of one plate being hinged to the supporting plate, whereas the free end of the other is hinged to a baseplate which carries the channel sections. The hinges are arranged to extend in planes normal to the axis of the torsion bar. The entire suspension thus constitutes a compact assembly which can be supplied as a unit and which need merely be bolted to the underframe and provided with the bucket seat. The manner in which the bucket seat is associated with the suspension is clearly shown in FIGURES 2 and 3. The damping factor which was achieved when testing a suspension of the kind shown in FIGURES 2 and 3 was well in excess of that which could in the past be achieved in purely mechanical spring seat suspensions. The bucket seat performs completely linear translatory motions, i.e. in FIGURES 2 and 3 vertical motions, without any tendency to tip about an axis parallel to the aris of the torsion bar. The back rest of the seat will not therefore kick the person sitting on the seat in the back whenever the seat rides up and down.

We claim:
1. A spring suspension for a seat such as the bucket seat of a field tractor vehicle or the like, comprising:
- a seat support adapted for attachment to the seat and a base plate adapted for attachment to the vehicle,
- a torsion bar device horizontally mounted upon the underside of the seat support and disposed transversely to the longitudinal axis of the seat support,
- at least one swing arm fixedly attached at one end to the torsion bar device with the free end adapted to move longitudinally above the base plate,
- channel means mounted longitudinally upon the base plate,
- roller means mounted upon the free end of the swing arm and travelling within the channel means to guide the longitudinal movement of the free end of the swing arm,
- and, upon each side of the swing arm, toggle means extending between and affixed to the seat support and the base plate, mounted external to the swing arm and channel means with their open sides facing inwardly,
- the hinges of said toggles being disposed parallel to the longitudinal axis of the seat support.

2. The assembly of claim 1 in which the torsion bar device comprises
- a tube to which the swing arm is affixed,
- bushings at each end of said tube, mounted upon said seat support and supporting the tube while permitting rotation thereof,
- within the tube a torsion bar, one end of which is non-rotatably affixed to the corresponding end of the tube, and the other end extending externally of the tube,
- a bushing to effect alignment of the external rod end with the tube,
- a radial arm upon the external end of the rod, and
- bias adjusting means acting between the seat support and the radial arm.

3. The assembly of claim 1 in which the torsion bar device is mounted transversely near the rear edge of the of the seat support.

4. The assembly of claim 1 in which each of the toggle devices is formed by two plates having substantially the same longitudinal dimension as the seat support, one plate being hinged to the seat support, the other to the base plate.

References Cited

UNITED STATES PATENTS

| | | | |
|---|---|---|---|
| 2,249,828 | 7/1941 | Herold | 248—373 |
| 2,590,859 | 4/1952 | Hickman | 248—400 X |
| 2,894,563 | 7/1959 | Simons et al. | 248—374 |
| 3,025,032 | 3/1962 | Leja | 267—1 X |
| 3,031,164 | 4/1962 | Schopf | 248—373 |
| 3,140,851 | 7/1964 | Bilancia | 297—307 X |

ROY D. FRAZIER, *Primary Examiner.*

CLAUDE A. LE ROY, *Examiner.*

R. P. SEITTER, *Assistant Examiner.*